Oct. 20, 1931.  J. W. WETTER  1,828,482
CONVEYER
Filed March 22, 1928  3 Sheets-Sheet 1
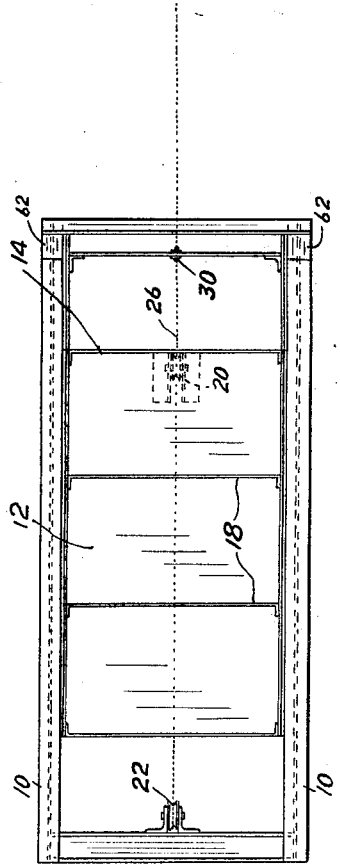
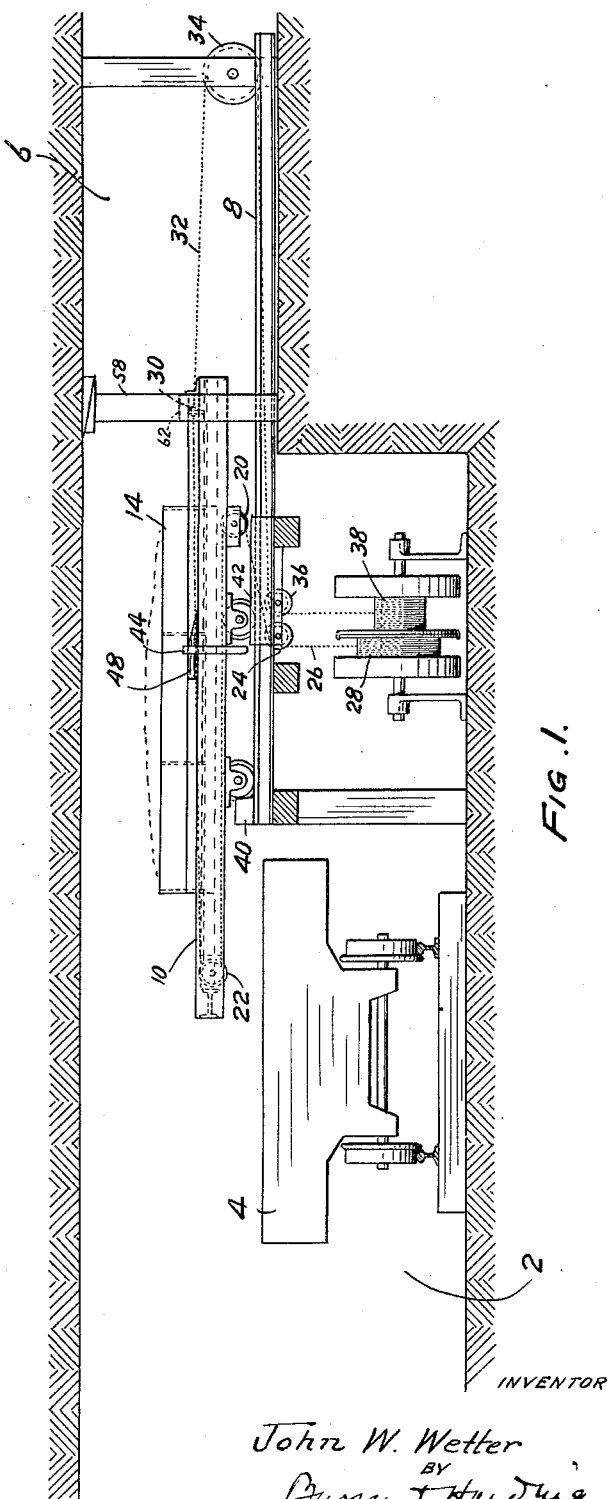
WITNESS:
INVENTOR
John W. Wetter
BY
ATTORNEYS.

Oct. 20, 1931.  J. W. WETTER  1,828,482
CONVEYER
Filed March 22, 1928   3 Sheets-Sheet 2
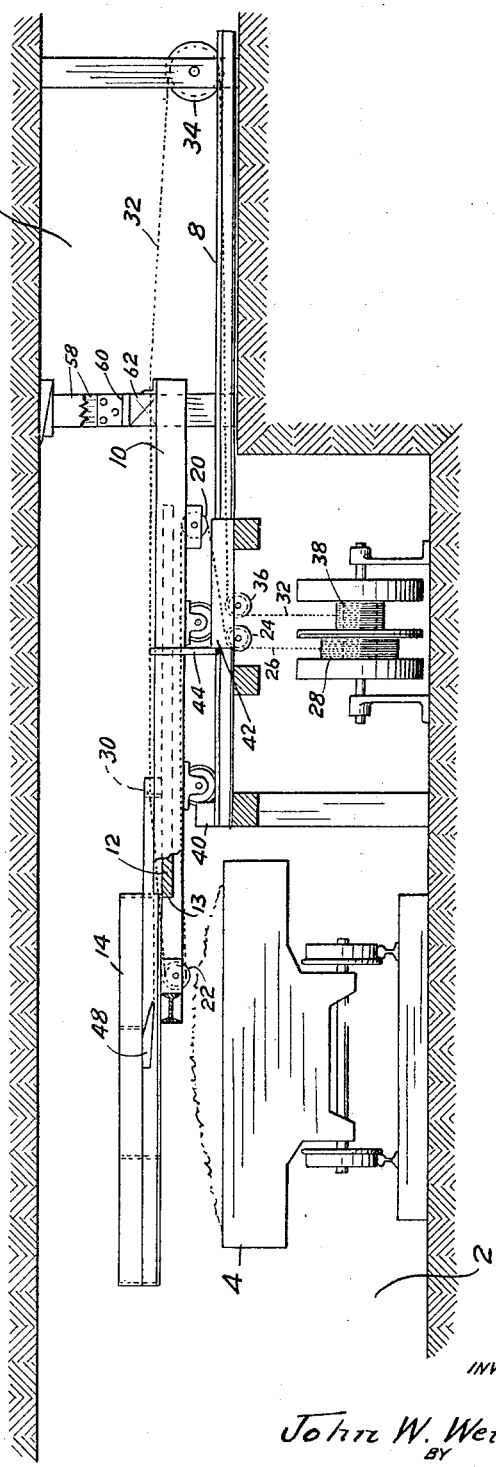
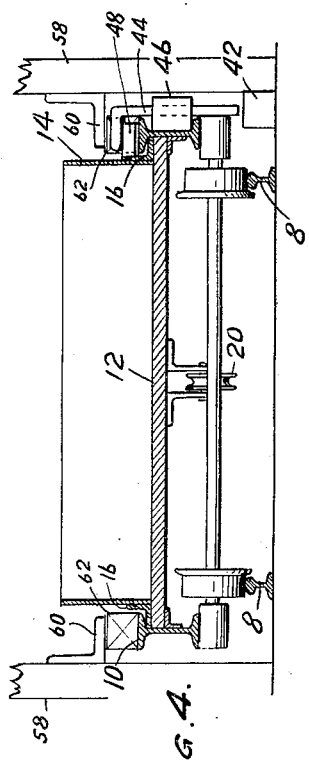
WITNESS:
INVENTOR
John W. Wetter
BY
ATTORNEYS Oct. 20, 1931.　　　J. W. WETTER　　　1,828,482
CONVEYER
Filed March 22, 1928　　　3 Sheets-Sheet 3
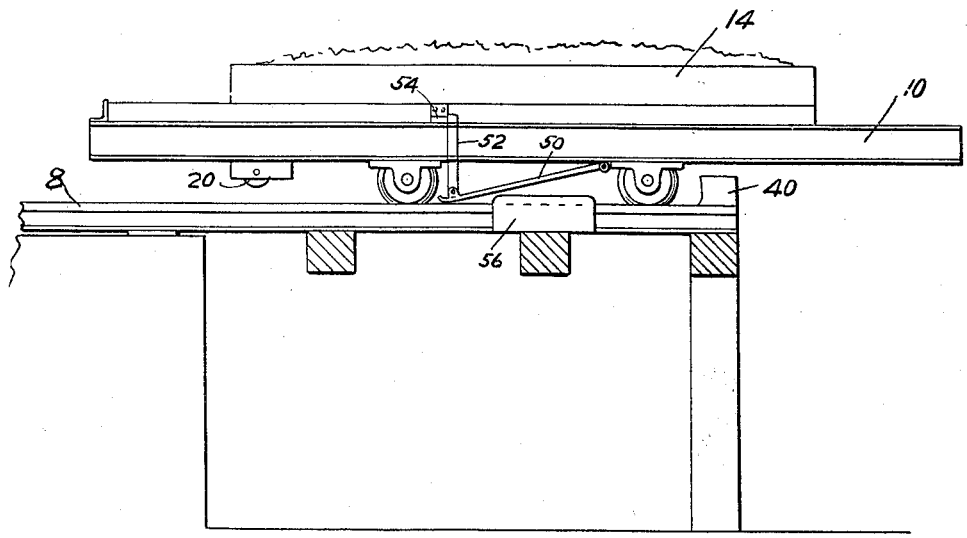
FIG. 5.
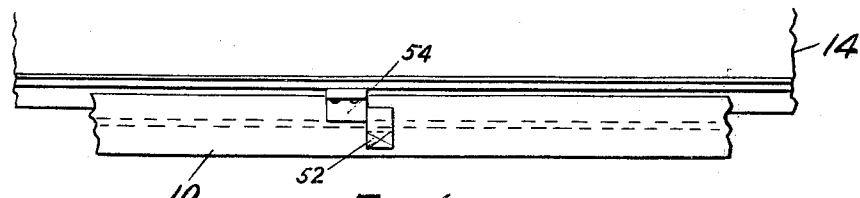
FIG. 6.
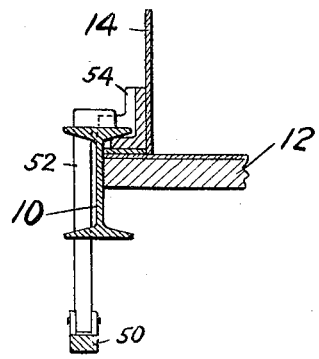 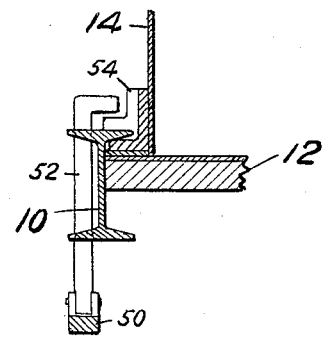
FIG. 7.　　　FIG. 8.
INVENTOR
John W. Wetter
BY
Busser & Harding
ATTORNEYS.
WITNESS:
Robt R Ketchel.

Patented Oct. 20, 1931

1,828,482

UNITED STATES PATENT OFFICE

JOHN WILLIAM WETTER, OF PHILIPSBURG, PENNSYLVANIA, ASSIGNOR TO MADEIRA, HILL & COMPANY, OF PHILADELPHIA, PENNSYLVANIA, A CORPORATION OF PENNSYLVANIA

CONVEYER

Application filed March 22, 1928. Serial No. 263,658.

This invention relates to a conveyer of the type particularly adapted for use in mines or the like to carry rock material or coal.

The object of this invention is to provide a conveyer which may be moved by power driven means from a loading to a discharging position and which, upon its arrival at the discharging position, will automatically unload either into a bin or a car or the like. A further object is to provide a conveyer of this type which will be restored to material holding position prior to its return movement from discharging to loading position, and which will not discharge the material prior to reaching discharging position.

Other objects and advantages resulting from this invention will be apparent upon reading the following description in connection with the accompanying drawings in which:

Fig. 1 is a sectional view of a mine or the like showing the improved conveyer in position just prior to the discharge of material therefrom;

Fig. 2 is a plan view of the conveyer;

Fig. 3 is a view similar to Fig. 1 showing the conveyer in discharging position;

Fig. 4 is a transverse sectional view through the conveyer;

Fig. 5 is a sectional view of the side of the conveyer opposite that shown in Figs. 1 and 3;

Fig. 6 is a detail plan view of one retaining means; and

Figs. 7 and 8 are sectional views illustrating the operation of the retaining means shown in Fig. 6.

As shown in the drawings, 2 indicates a horizontally extending passageway in a mine in which are laid tracks for facilitating the movement of a car 4, which is adapted to receive the material mined from the end face of a second horizontally extending passageway 6. Within passageway 6 and extending adjacent the position of car 4, there are suitably positioned tracks 8 on which a carriage 10 is mounted for movement longitudinally of passageway 6. Carriage 10 is provided with a horizontal platform 12 which, as shown most clearly in Fig. 3, does not extend the full length of carriage 10 but extends so that when the carriage is at the limit of its movement toward car 4, the transverse end 13 is positioned over the nearer side of the car. Slidably mounted for movement in the direction of the rails and upon platform 12 is a frame 14 of rectangular shape having vertically extending walls and provided at its bottom with flanges 16 engaging under the flanges of the I-beams which form the sides of carriage 10. It will be noted that frame 14 is open at its bottom so that it, together with platform 12, forms a receptacle for the material. Frame 14 is desirably provided with transverse partitions 18 for a purpose which will be clear hereafter.

Adjacent its rear end, the carriage 10 is provided with a pulley 20, while a second pulley 22 is mounted at the front of the frame in a position extending over car 4. A third pulley 24 is suitably mounted on the track structure on which carriage 10 runs, and over pulleys 20, 22 and 24 there extends a cable 26 one end of which is wound around a drum 28, while the other end passes upwardly from pulley 22 and is connected at 30 to a rear extension of frame 14, the cable passing either directly over the surface of platform 12 or in a slot therein. Drum 28 may be driven in a direction to wind up cable 26 by either power or hand operated means.

Secured also at 30 to the frame 14 there is a second cable 32 which passes to the rear about a pulley 34, suitably fixed at the loading position within horizontal passageway 6, and thence forwardly about a pulley 36 mounted on the rail structure, and to another drum 38 which may be driven similarly to drum 28, in a direction to wind up cable 32 to move carriage 10 to loading position. Although pulley 34 is shown in Figs. 1 and 3 for illustrative purposes as located quite near to the discharging position of the carriage, it will be understood that in practice pulley 34 is located at or near the working face, which may be at a very considerable distance from the discharge end of passageway 6.

At the ends of tracks 8 there is positioned a stop 40 for arresting the forward movement of carriage 10. It will be obvious that if the carriage is assumed to be in loading position with frame 14 positioned above platform 12 to provide a compartment into which material may be loaded, the drum 28 is then operated to wind up cable 26. At this time a retaining means which will be later described holds frame 14 from movement relative to carriage 10 and therefore the carriage and frame will be moved forwardly along tracks 8 until stop 40 is engaged and further movement thereby prevented. As such engagement occurs, the retaining means is released and a further winding up of cable 26 results in a continued forward movement of frame 14 relative to the carriage to its extreme forward position shown in Fig. 3. During this relative movement, the material is forced over the end 13 of platform 12 by means of partitions 18 or the rear wall of frame 14.

If, after this discharge, drum 38 is actuated to wind up cable 32, the frictional resistance to relative movement between frame 14 and carriage 10 would be so great as to allow the return of carriage 10 to loading position prior to the displacement of the frame into a position to load material. To secure the re-positioning of frame 14 upon platform 12, there is provided on the track structure a suitable stop 42 which is arranged for engagement with the lower end of a member 44 mounted for vertical sliding in a guide 46, secured to carriage 10. A wedge 48 is secured to frame 14 and when frame 14 is in position above platform 12, this wedge engages under the bent over upper end of member 44 to raise its lower end out of engagement with stop 42. As frame 14, however, moves forwardly to discharging position, as shown in Fig. 3, the wedge 48 slides from under the upper end of member 44, permitting member 44 to drop into engagement with the forward face of stop 42. Thus, upon initial winding of cable 32, rearward movement of the carriage is prevented by the engagement of member 44 with stop 42, and rearward movement of frame 14 over platform 12 ensues. As soon as the frame 14 reaches a proper position over platform 12, however, wedge 48 enters beneath the upper end of member 44, lifting the member out of engagement with stop 42 and further winding of cable 32 then causes a rearward movement of the carriage with frame 14 in loading position.

The retaining means for preventing relative movement between the frame and carriage comprises a lever 50 connected to a slide 52 passing, for example, through apertures in the flanges of beams 10, and having a turned upper end as indicated in Figs. 7 and 8. This turned end normally engages in front of a stop 54 secured to frame 14, thus preventing forward movement of the frame relative to the carriage. As the carriage approaches stop 40, lever 50 rides over the rear edge of a cam block 56 carried by the rail supports thus disengaging the turned end of 52 from stop 54, as shown in Fig. 8, and permitting further movement of the frame. As the carriage moves backward following a release of 44, member 52 may again drop into retaining position.

In order to prevent upward tilting of the rear end of the carriage when in unloading position as in Fig. 3, posts 58 may be provided each of which carries an angular member 60 extending over the upper surface of a block 62 mounted on one side of the frame. Blocks 62 are of sufficient height to permit an upward spacing of members 60 to clear the retaining means on the sides of the frame. Any upward movement of the rear of the frame will be prevented by the means described.

While the entire frame has been shown as slidable relatively to the carriage, it is obvious that the side members might be fixed to the carriage, the ends and partitions 18 being secured to a drawbar or the like to discharge the material.

It will be obvious that other various mechanical details of the improved conveyer may be changed without departing from the spirit of the invention as defined in the following claims.

Having now fully described my invention, what I claim and desire to protect by Letters Patent is:

1. In combination, a carriage having a platform, a frame having upright walls mounted on said carriage to confine material upon the platform, and means for moving said carriage from a loading to a discharging position and for discharging material therefrom, including a sheave carried by the carriage, a second sheave carried by the carriage rearwardly of the first sheave, a flexible member connected to the frame and trained successively about the first and second sheaves, means for taking up the flexible member, and means for arresting forward movement of the carriage at the discharging position, whereby continued taking up of the flexible member after the carriage reaches the discharging position serves to move the frame forwardly beyond the platform to discharge the material.

2. In combination, a carriage having a platform, a frame having upright walls mounted on said carriage to confine material upon the platform, and means for moving said carriage from a loading to a discharging position and for discharging material therefrom, including a sheave carried by the carriage, a flexible member connected to the frame and trained about said sheave, means for taking up the flexible member, and means for arresting forward movement of the carriage at the discharging position, whereby continued taking up of the flexible member after the carriage reaches the discharging position serves to move the frame forwardly beyond the platform to discharge the material.

3. In combination, a carriage having a platform, means for moving said carriage from a loading to a discharging position, means for returning said carriage from discharging position to loading position, a frame having upright walls mounted on said carriage to confine material upon the platform, and means for arresting movement of the carriage at discharging position, said frame being mounted to slide relatively to said platform to permit the discharge of material over an edge of the platform, said moving means including a sheave carried by the carriage, a flexible member connected to the frame and trained about said sheave, and means for taking up the flexible member, and being operative, upon the arresting of the carriage, to continue the movement of the frame to discharge material, and said returning means being operative to first return said frame to position to confine material upon the platform and then return the carriage to loading position.

4. In combination, a carriage, means for moving said carriage from a loading to a discharging position, a frame movable relatively to the carriage and adapted to hold material thereon, said moving means including a sheave carried by the carriage, a flexible member connected to the frame and trained about said sheave, and means for taking up the flexible member, and being operative, upon the arrival of the carriage at discharging position, to relatively move said carriage and frame to discharge the material, and means for preventing relative movement between the frame and carriage except at the discharging position.

In testimony of which invention, I have hereunto set my hand, at Philipsburg, Pennsylvania, on this fifteenth day of March, 1928.

JOHN WILLIAM WETTER.